US011130931B2

(12) United States Patent
Lai et al.

(10) Patent No.: US 11,130,931 B2
(45) Date of Patent: Sep. 28, 2021

(54) COMPOSITIONS AND METHODS FOR CLEARING TISSUE

(71) Applicant: The University of Hong Kong, Hong Kong (HK)

(72) Inventors: Hei Ming Lai, Hong Kong (HK); Wutian Wu, Hong Kong (HK)

(73) Assignee: THE UNIVERSITY OF HONG KONG, Hong Kong (HK)

( * ) Notice: Subject to any disclaimer, the term of this patent is extended or adjusted under 35 U.S.C. 154(b) by 136 days.

(21) Appl. No.: 16/467,755

(22) PCT Filed: Dec. 21, 2017

(86) PCT No.: PCT/CN2017/117669
§ 371 (c)(1),
(2) Date: Jun. 7, 2019

(87) PCT Pub. No.: WO2018/113723
PCT Pub. Date: Jun. 28, 2018

(65) Prior Publication Data
US 2020/0224129 A1 Jul. 16, 2020

Related U.S. Application Data

(60) Provisional application No. 62/438,124, filed on Dec. 22, 2016.

(51) Int. Cl.
*G01N 1/34* (2006.01)
*C11D 7/32* (2006.01)
(Continued)

(52) U.S. Cl.
CPC .............. *C11D 7/3272* (2013.01); *C11D 7/10* (2013.01); *C11D 7/263* (2013.01); *C11D 7/3209* (2013.01);
(Continued)

(58) Field of Classification Search
CPC ....................................................... G01N 1/28
(Continued)

(56) References Cited

U.S. PATENT DOCUMENTS 6,232,092 B1    5/2001   Rogers
6,472,216 B1   10/2002   Chiang
(Continued)

FOREIGN PATENT DOCUMENTS

WO   2014004563   1/2014
WO   2016006861   1/2016
WO   2016023009   2/2016

OTHER PUBLICATIONS

Ando, et. al., "Inside Alzheimer brain with CLARITY: senile plaques, neurofibrillary tangles and axons in 3-D", Acta Neuropathol., 128:457-459 (2014).
(Continued)

*Primary Examiner* — Gregory E Webb
(74) *Attorney, Agent, or Firm* — Pabst Patent Group LLP

(57) ABSTRACT

A composition and a method for clearing tissue for subsequent three-dimensional analysis. The clearing composition comprises: (1) a homogenizing agent such as N-methylglucamine, urea, or ethylenediamine; (2) a cytoplasmic, water-soluble refractive index adjusting agent such as iohexol, sodium thiosulfate, or polyethylene glycol; and (3) a membrane, lipid-soluble RI adjusting agent such as 2,2'-thiodiethanol (TDE) or propylene glycol. The tissue clearing composition is particularly suitable for use with long-term fixed human tissues.

22 Claims, 7 Drawing Sheets

(51) Int. Cl.
*C11D 7/10* (2006.01)
*C11D 7/26* (2006.01)
*C11D 7/34* (2006.01)

(52) U.S. Cl.
CPC .............. *C11D 7/3263* (2013.01); *C11D 7/34* (2013.01); *G01N 1/34* (2013.01)

(58) Field of Classification Search
USPC ............................................ 435/287.1, 7.21
See application file for complete search history.

(56) References Cited

U.S. PATENT DOCUMENTS

| | | |
|---|---|---|
| 9,624,298 B2 | 4/2017 | Nastri |
| 2015/0044376 A1 | 2/2015 | Topf |
| 2016/0123854 A1 | 5/2016 | Gradinaru |
| 2016/0131560 A1 | 5/2016 | Gradinaru |
| 2018/0031452 A1* | 2/2018 | Imai ....................... G02B 21/34 |
| 2020/0271553 A1* | 8/2020 | Park ....................... C07C 235/12 |

OTHER PUBLICATIONS

Chung, et. al., "Structural and molecular interrogation of intact biological systems", Nature. 497 (7449): 332-37 (2013).
Costantini, et. al., "A versatile clearing agent for multi-modal brain imaging", Scientific Reports, 5:9808 (2015).
Hama, et. al, "ScaleS: an optical clearing palette for biological imaging", Nat. Neurosci., 18:1518-29 (2015).
Ke, et al., "Super-Resolution Mapping of Neuronal Circuitry With an Index-Optimized Clearing Agent", Cell Reports, 14:2718-32 (2016).
Lai, et. al., "Rationalisation and Validation of an Acrylamide-Free Procedure in Three-Dimensional Histological Imaging", PLoS One, 11 :e0158628 (2016).
Liebmann, et al., "Three-dimensional study of Alzheimer's disease hallmarks using the iDisco clearing method", Cell Rep., 16(4) :1138-1152 (2016).
Liu, et. al., "Bringing CLARITY to the human brain: visualisation of Lewy pathology in three-dimensions", Neuropathology and Applied Neurobiology, 42, 573-587 (2016).
Murray, et al., "Simple, Scalable Proteomic Imaging for High-Dimensional Profiling of Intact Systems", Cell, 163(6): 1500-1514 (2015).
Pan, et. al., "Shrinkage-mediated imaging of entire organs and organisms using uDISCO", Nat. Methods, 13(10):859-67 (2016).
Phillips, et al., "Development of passive CLARITY and immunofluorescent labelling of multiple proteins in human cerebellum: understanding mechanisms of neurodegeneration in mitochondrial disease", Scientific Reports, 6:26013 (2016).
Susaki, et al., "Whole-brain Imaging with Single-Cell Resolution Using Chemical Cocktails and Computational Analysis", Cell, 157:726-739 (2014).
Yang, et al., "Single-Cell Phenotyping with Transparent Intact Tissue Through Whole-Body Clearing", Cell, 158(4):945-958 (2014).

* cited by examiner

COMPOSITIONS AND METHODS FOR CLEARING TISSUE

CROSS-REFERENCE TO RELATED APPLICATIONS

This application is a National Phase application under 35 U.S.C. 371 of International Application No. PCT/CN2017/117669, filed Dec. 21, 2017, which claims priority to and benefit of U.S. Provisional Application No. 62/438,124, filed Dec. 22, 2016, and which are hereby incorporated herein by reference in their entirety.

FIELD OF THE INVENTION

The disclosed invention is generally in the field of tissue clearing and specifically in the area of analysis of biological tissues using a tissue clearing composition to make biological tissues transparent.

BACKGROUND OF THE INVENTION

Although biological specimens are intrinsically three-dimensional, the obscuring effects of light scatter hamper high resolution deep tissue imaging. One method of visualizing thick tissues is by serially cutting them into thin sections and using those sections to reconstruct a three-dimensional image with computational methods. However, not only is this method laborious, but it's also limiting in instances where the true three-dimensional nature of a tissue cannot be ascertained by thin sections. Investigation of complex cells with large projections such as those of the nervous system and fine structures in pathological tissues is best performed in intact tissue.

In an effort to retain the authentic three-dimensional structure of a tissue, there has been a surge of interest in developing tissue Clearing agents and techniques. Tissue clearing techniques directly turn tissues transparent, allowing imaging deep within the tissue. With the use of microscopes capable of imaging a selective plane of depth (i.e. optically sectioning the tissue), a 3D image can be rapidly acquired, with no cutting artifacts or sample destruction in serial-sectioning methods. Good optical clearing methods facilitate deep tissue biological imaging by mitigating light scattering in situ while preserving tissue integrity for accurate signal reconstruction.

Tissue clearing techniques often alter the physicochemical properties of the tissue. Presently available compositions for clearing tissues may cause substantial swelling that leads to structural distortion. In some cases, clearing agents are only suitable for very small samples due to their limited clearing efficacy. Existing clearing agents also take a long time to clear tissues and require multiple steps for tissue treatment before optical clearing. Additionally, they are not compatible with archived tissues that have been fixed with formalin for a long time.

The overall process of tissue clearing can be viewed as tissue refractive index (RI) homogenization (that is, homogenizing or making more equal the refractive index of the tissue). The currently available methods can be classified into (1) aqueous-based simple RI homogenization, (2) delipidation-assisted RI homogenization, and (3) organic solvent-based RI homogenization. The latter two categories each have their own strengths, but can cause substantial tissue damage and are typically not suitable for postmortem human tissues (Table 1).

TABLE 1

|  | Aqueous-based RI-homogenization | Delipidation-assisted RI-homogenization | Organic solvent-based RI-homogenization |
| --- | --- | --- | --- |
| Examples | ScaleS, Clear$^T$ | CLARITY ™, CUBIC ™, SWITCH ™, FASTClear | BABB ™, 3DISCO ™, uDISCO, FASTClear |
| Advantages | Compatible with lipophilic tracers and subsequent ultrastructural studies | Best results with immunostaining, least tissue discoloration | Best for lipid-rich regions |
| Disadvantages | Incompatible/poorly compatible with immunostaining, comparatively poor tissue transparency | Incompatible with lipophilic tracers, ultrastructural evaluation, can be slow for lipid-rich regions, comparatively long tissue processing time | Incompatible with lipophilic tracers, ultrastructural evaluation, significant tissue discoloration and autofluorescence, can be incompatible with fluorescent proteins |

Conversely, even though category (1) causes the least damage, its tissue clearing efficacy is not as good as that of the other two methods. This creates a need for improved aqueous-based tissue clearing methods that lead to improved tissue transparency with maximal structural preservation. Preferably, these methods are suitable for use with human tissues, and are not only compatible with all existing chemical staining methods and electron microscopy, but are also compatible with future diagnostic and research methods.

There is an increased need for three-dimensional imaging and analysis in basic research. Three-dimensional imaging aids in the understanding of biological structures and function of organs during development and pathogenesis. Tissue clearing after staining leads to improved quality of images.

It is an object of the invention to provide a tissue clearing composition with improved tissue clearing capabilities.

It is a further object of the invention to provide improved methods of clearing tissues.

It is a further object of the invention to provide improved methods of clearing human tissues.

BRIEF SUMMARY OF THE INVENTION

Disclosed herein are compositions and methods for clearing tissues useful for, for example, subsequent three-dimensional analysis. In some forms, the disclosed tissue clearing compositions are composed of three core components:

(1) a homogenizing agent (such as N-methylglucamine (NMG), urea, or ethylenediamine);

(2) a cytoplasmic, water-soluble RI adjusting agent (such as iohexol, sodium thiosulfate, or polyethylene glycol); and (3) a membrane, lipid-soluble RI adjusting agent (such as 2,2'-thiodiethanol (TDE) or propylene glycol).

In preferred forms, the disclosed tissue clearing compositions do not contain detergents or denaturants, which allows for the preservation of lipid membranes for lipophilic tracing and subsequent imaging. In some forms, the disclosed methods can involve a single step incubation of tissue in a disclosed tissue clearing composition.

Different forms of the disclosed tissue clearing compositions are particularly useful for different tissues and source species, such as a brain-specific composition, liver-specific composition, or human brain tissue-specific composition versus mouse brain tissue-specific composition. Some specific tissue clearing compositions are particularly useful for tissues retrieved from archived sources (such as those archived for up to 50 years) versus recently fixed tissues (such as those fixed within 3 weeks to 3 months, which is typical for human tissues). In some forms, the disclosed tissue clearing compositions can contain 10% urea, 25% 2,2'-thiodiethanol, and 32% iohexol. In some forms, the tissue clearing compositions can contain 20% N-methylglucamine, 25% 2,2'-thiodiethanol, and 32% iohexol. In some forms, the tissue clearing compositions can contain 20% N-methylglucamine, 35% propylene glycol, and 32% iohexol. As may be suitable for any particular application, the concentrations of these compounds can vary. In some forms, the composition is suitable for most robust, general applications. In some forms, the composition is suitable for use with long-fixed human tissues. In some forms the composition is suitable for in vivo clearing applications.

The disclosed tissue clearing compositions can include additional components that, for example, make the composition useful or tailored for specific tissues and source species to which it is to be applied. In some forms, the disclosed tissue clearing compositions are compatible with, for example, further processing methods for conventional histology and electron microscopy studies, other tissue clearing methods, different tissue staining methods (such as immunohistochemistry, chemical staining, transgenic cell labelling methods, imaging probes, tissue in situ chemistry, and viral tracing methods), or combinations thereof.

Additional advantages of the disclosed method and compositions will be set forth in part in the description which follows, or may be learned by practice of the disclosed method and compositions. The advantages of the disclosed method and compositions will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed method and compositions and together with the description, serve to explain the principles of the disclosed method and compositions.

FIG. 6A depicts the proposed CLARITY™ hydrogel-tissue hybridization reaction (path a), where acrylamide's nitrogen atom is hypothesized to attack the formaldimine carbon formed when tissue proteins were allowed to react with formaldehyde; whilst it was well-established that protein amines can attack the formaldimine carbons (path b), leading to protein cross-linkage which is the basis of conventional fixation. FIG. 6B depicts a model reaction using lysozyme as the model protein to simulate the CLARITY™ protein-hydrogel hybridization for protein mass spectrometry analysis. FIGS. 6C-6E depict possible reactions between a formaldehyde-modified protein and acrylamide. FIG. 6C shows nucleophilic addition of the amide nitrogen to the formaldimine group, as proposed in CLARITY™. FIG. 6D shows nucleophilic addition of thiol groups from cysteine residues in proteins to the Michael-receptive double bond of acrylamide, rendering it unable to crosslink to the polyacrylamide meshwork by polymerization. FIG. 6E shows the formation of simple adducts, which potentially explains the heterogeneity and noise seen in the spectrometry data.

DETAILED DESCRIPTION OF THE INVENTION

Figure 1:
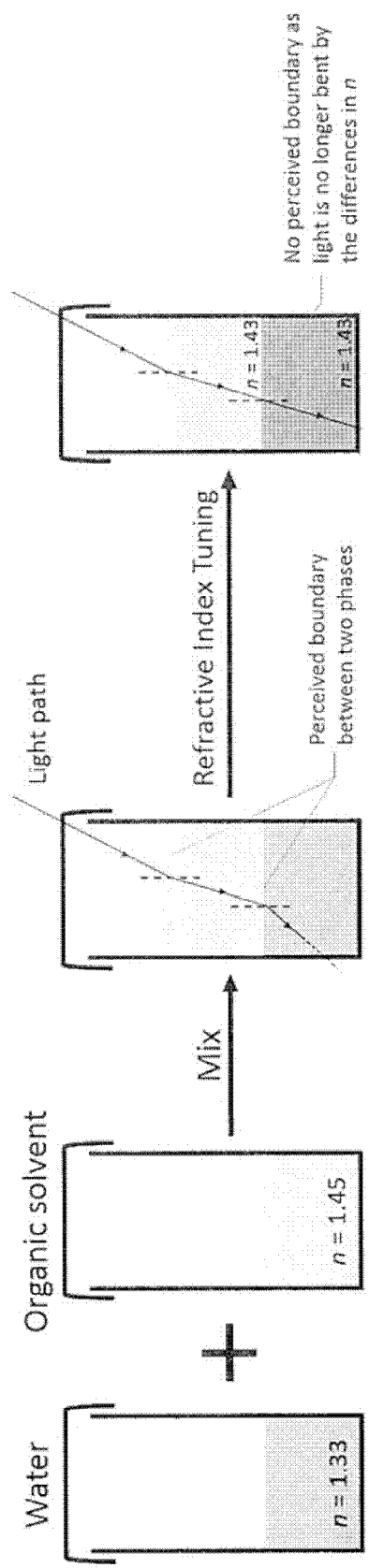
FIG. 1 is a scheme depicting theoretical refractive index (RI) tuning. RI differences between two opposing media cause bending of light paths, and can theoretically be eliminated by tuning each media's refractive indices to match one another.

Disclosed herein are compositions and methods for clearing tissues useful for, for example, subsequent three-dimensional analysis. Investigation of complex cells with large projections such as those of the nervous system and of fine structures in pathological tissues is best performed in intact tissue. The disclosed compositions and methods eliminate the need for sectioning of tissue, making the procedure faster than conventional histological study (typically 12-15 times faster). The transparency achieved by using the disclosed compositions and methods can enhance observation capability and signal detection sensitivity of cellular structures, including, for example, fluorescent and non-fluorescent cellular structures. The disclosed compositions and methods also allow for three-dimensional viewing of the tissue in any orientation, either whole, or in virtual sections, and obviates other issues, such as loss of slides.

It has been discovered that, by tuning the refractive index (RI) of different portions of cells and tissues (such as aqueous portions, lipid/hydrophobic portions, protein portions, cytoplasm, nucleus) to be matched (identical or similar), relative transparency or translucence of intact or whole tissue can be achieved. It was discovered that by using at least one agent that adjusts the RI of aqueous portions of the tissue and one agent that adjusts the RI of lipid/hydrophobic portions of the tissue, the RI of these different tissue portions can be made identical or brought closer together in value. Such tuning of the RI of the tissue' portions results in less refractive distortion and thus increased transparency or translucence. Generally, the agents are chosen to segment or fractionate to the tissue component they are intended to adjust. This can generally be accomplished by using, for example, relatively hydrophilic agents for adjusting the RI of aqueous portions of the tissue and relatively hydrophobic agents for adjusting the RI of the lipid/hydrophobic portions of the tissue. It is preferred that the agents be selected to adjust the RI of their target tissue portion toward the RI of the other tissue portion(s).

It was also discovered that, because agents used to adjust the RI of tissue portions do not effectively become physically apposed to some undenatured proteins in tissue, and because such unadjusted, undenatured proteins can affect the RI of tissue portions in which they occur, it is useful to use, for some tissues, an agent that renders some or all of the problematic proteins more accessible to the RI adjusting agent. Such homogenizing agents thus allow for more complete tuning or matching of the RIs of different tissue portions.

After the basic discovery discussed above, it was realized that, because difference tissues contain different components, the refractive indices of tissue portions in different tissues can be different. Because off this, it was realized that the results of the disclosed compositions and methods can be improved by choosing agents, their concentrations/proportions, or combinations thereof, that can adjust the RI of the target tissue portions and target tissue to the correct extent based on the particular nature of the components of the target tissue. This feature of the selection of the agents and the concentrations/proportions of the agents to be tuned or matched to a given target tissue can generally be simplified by noting the RI of the given portions of the target tissue and choosing agents and the concentrations/proportions of the agents to tune the RI of different portions of that tissue to the same or similar RI values. In this way, the present discoveries allow the formulation of tissue clearing compositions tuned or matched to a wide variety of different tissues by following the clear principles that were discovered and developed. In some forms, the disclosed tissue clearing compositions feature low viscosity, low osmolality, a low concentration of chemicals, or combinations thereof. These properties translate to easier manipulation, faster tissue clearing times, single-step methodologies, better tissue preservation, lower cost of production, or combinations thereof. The disclosed tissue clearing compositions can be referred to as "OPTIClear compositions." In preferred forms, the disclosed tissue clearing compositions do not contain detergents or denaturants, which allows for the preservation of lipid membranes for lipophilic tracing and subsequent imaging. In some forms, the disclosed methods can involve a single step incubation of tissue in a disclosed tissue clearing composition.

In some forms, the disclosed tissue clearing compositions exhibit improved clearing capabilities in human tissues, which has been difficult to accomplish with other methods and other compositions, allowing for visualization of structures down to 300 µm within 3 hours. In some forms, the disclosed tissue clearing compositions can be used to clear archived and formalin-fixed, paraffin-embedded (FFPE) tissues. In some forms, the disclosed tissue clearing compositions can be used to clear biopsied tissues from clinical settings to facilitate pathological diagnoses. In some forms, long time storage after tissue clearing is also possible.

A comparison between an example of the disclosed tissue clearing compositions and other presently available clearing agents is provided in Table 2.

TABLE 2

|  | Tissue Clearing Composition (brain) | SWITCH clearing agent | SeeDB2S | PACT-RIMS | 47% TDE |
|---|---|---|---|---|---|
| Composition | 20% NMG, 25% TDE, 32% Iohexol | 40% NMG, 50% diatrizoic acid, 55% iodixanol | 70.4% iohexol, 2% saponin, in Tris-EDTA buffer | 88% iohexol, 0.1% Tween-20, in 0.02M PB buffer | 47% TDE in phosphate buffer |
| Viscosity | Low | High | High | High | Low |
| Osmolality | Low | High | High | High | Low |
| Cost§ | 137.61 USD/100 ml | 221.84 USD/100 ml | 287.23 USD/100 ml | 359.04 USD/100 ml | 4.49 USD/100 ml |
| Time of RI homogenization | 3-6 hours | 6-12 hours | 8 hours | 6-12 hours | Overnight |
| Preparation steps before clearing | Can be none, or 2 optional delipidation steps (min. 1 day) | 6 steps (min. 7 days in total) | 3 steps (min. 1.5 days) | 5 steps (average 4 weeks) | 5 steps (average 4 weeks), but incomplete transparency frequently results with human tissues |

TABLE 2-continued

| Tissue Clearing Composition (brain) | SWITCH clearing agent | SeeDB2S | PACT-RIMS | 47% TDE |
|---|---|---|---|---|
| Compatibility with various fluorescent labels | Fluorescent proteins, fluorophore-conjugated antibodies, chemical stains, lipophilic tracers | Fluorescent proteins, fluorophore-conjugated antibodies, chemical stain | Fluorescent proteins, chemical stains (theoretically possible), lipophilic tracers (theoretically Possible) | Fluorescent proteins, chemical stain | Fluorescent proteins, chemical stains |
| Compatibility with subsequent transmission electron microscopy | Yes | No | Yes (theoretically possible) | No | No |
| Human tissue applicability | Yes, directly applicable | Yes, indirectly | No | Yes, indirectly | Yes, indirectly, incomplete transparency |
| Clearing time for 1 mm-thick human tissue | 6 hours | Not stated, but at least 4 days without fixation | N/A | 1 month (incomplete clearing) | 1 month (incomplete clearing) |

I. Definitions.

The term "tissue clearing" as used herein refers to a process that has the effect of tuning, matching, or homogenizing the refractive index (RI) of tissue, generally resulting in an increase in the transparency of the tissue.

The term "homogenizing" as used herein refers to the act of making a composition, such as a solution, tissue, or tissue portion, uniform throughout by blending unlike elements or features. For example, in the context of the RI of tissue, homogenization produces a more even or matched RI throughout the tissue.

The term "tuning" as used herein in the context of tissue RI refers to the act of making different tissue portions more uniform in RI throughout. For example, in the context of the RI of tissue, tuning produces a more even or matched RI throughout the tissue. In the context of agents used to tune tissue RI, tuning refers to selecting agents and proportions of agents to accomplish the tuning of the tissue RI.

The term "matching" as used herein in the context of tissue RI refers to the act of making different tissue portions more uniform in RI to each other. For example, in the context of the RI of tissue, matching produces a more even or matched RI throughout the tissue. In the context of agents used to match tissue RI, matching refers to selecting agents and proportions of agents to accomplish the matching of the tissue RI.

The term "homogenizing agent" as used herein refers to a compound or composition that increases the homogeneity of a difficult to blend mixture (such as tissue).

The terms "water-soluble adjusting agent" and "water-soluble RI adjusting agent" as used herein refer to a compound or composition that can selectively adjust the RI of the aqueous compartments of tissue, such as the cytoplasm, cytosol, extracellular compartments, interstitial fluid, blood, plasma, and lymph.

The term "water-soluble" as used herein in reference to a component refers to the ability of the component to dissolve in water.

The terms "lipid-soluble adjusting agents" and "lipid-soluble RI adjusting agents" as used herein refer to a compound or composition that can selectively adjust the RI of the lipid-rich, membranous, or adipose compartments of tissue.

The term "lipid-soluble" as used herein in reference to a component refers to the ability of the component to dissolve in fats, oils, lipids, and non-polar solvents.

The term "refractive index adjusting agent" or "RI adjusting agent" as used herein refers to a compound or composition that selectively adjusts the RI of either lipid-rich or aqueous compartments of tissue.

The term "refractive index" or "RI" as used herein refers to the ratio of the speed of radiation (such as in electromagnetic radiation or light) in one medium (such as air, glass, or a vacuum), to that in another medium.

The term "archived tissue" as used herein refers to a tissue that has been preserved for short-term or long-term storage. Tissue may be preserved by heat fixation, immersion in a fixative solution, blood low perfusion, freezing, formalin-fixation and paraffin-embedding, or any other chemical or other available method.

II. Compositions

Provided herein are compositions for clearing tissues for subsequent three-dimensional analysis. The disclosed compositions can include additional components that, for example, make the composition useful or tailored for specific tissues and source species to which it is to be applied. In some forms, the disclosed tissue clearing compositions are composed of three core components: (1) a homogenizing agent, (2) a cytoplasmic, water-soluble RI adjusting agent, and (3) a membrane, lipid-soluble RI adjusting agent.

A. Homogenizing Agents

Homogenization is any of several processes used to make a mixture of two mutually non-soluble liquids the same or similar throughout. This is typically achieved by turning one of the liquids into a state consisting of extremely small particles distributed uniformly throughout the other liquid. Homogenizing agents are products which improve the homogeneity of difficult to blend mixtures. This facilitates true homogenization of water-soluble and water-insoluble agents together with the tissue components to achieve better optical homogeneity. In some forms of the tissue clearing compositions, N-methylglucamine can be used as a homogenizing agent. In other forms, urea may be used as a homogenizing agent. In some forms, ethylenediamine can be used as a homogenizing agent. However, as is understood by those of skill in the art, there are numerous other agents or methods known to those of skill in the art that can be used to homogenize a mixture. Such agents and methods can be used with the disclosed compositions and methods.

The final concentration of the homogenizing agent in the tissue clearing composition can vary. However, higher concentrations of homogenizing agent may compromise tissue integrity or fluorescent protein signal intensities. In some forms, the concentration of urea in the tissue clearing compositions can range from 10% to 24%. Preferably, the concentration of urea is 10%. In some forms, the concentration of N-methylglucamine in the tissue clearing compositions can range from 20% to 50%. Preferably, the concentration of N-methylglucamine is 20%.

B. Refractive Index (RI) Adjusting Agents

In most forms, the disclosed tissue clearing compositions employ the optic characteristics of various chemicals to reduce the loss of light passing through a tissue sample and thereby increase light retrieval efficiency.

Water-soluble RI adjusting agents selectively adjust the RI of the aqueous compartments of the tissue, such as the cytoplasm, cytosol, extracellular compartments, interstitial fluid, blood, plasma, and lymph. Water-soluble RI adjusting agents suitable for use with the disclosed tissue clearing compositions include, but are not necessarily limited to agents such as iohexol, sodium thiosulfate, or polyethylene glycol. In other forms, water-soluble adjusting agents may include metrizamide, iodixanol, diatrizoate sodium, and sodium iodide.

Lipid-soluble RI adjusting agents selectively adjust the RI of the lipid-rich, membraneous, or adipose compartments of the tissue. Lipid-soluble RI adjusting agents suitable for use with the disclosed tissue clearing composition include, but are not necessarily limited to agents such as 2,2'-thiodiethanol (TDE) or propylene glycol. In other forms, lipid-soluble adjusting agents may include glycerol, ethylene glycol, sodium dodecyl sulphate, trimethylamine, triethanolamine, triethanolamine-borate acid (1:1) adduct.

The suitability of specific RI adjusting agents may be determined using various assays. In some forms, the assay involves incubating a tissue homogenate in various concentrations of the adjusting agent in the presence of a homogenizer (such as N-methylglucamine or urea). Preferably, the assay includes both a water-soluble and a lipid-soluble adjusting agent to achieve the desirable reduction in homogenate opacity. Homogenate opacity may be measured by using a spectrophotometer over UV light, visible light, and near- and infrared light ranges.

C. Excipients

The compositions disclosed herein may additionally contain a pharmaceutically acceptable excipient, which, as used herein, includes any and all solvents, dispersion media, diluents, or other liquid vehicles, dispersion or suspension aids, surface active agents, isotonic agents, thickening or emulsifying agents, preservatives, solid binders, lubricants and the like, as suited to the particular composition. Except insofar as any conventional excipient medium is incompatible with a substance or its derivatives, such as by producing any undesirable biological effect or otherwise interacting in a deleterious manner with any other component(s) of the pharmaceutical composition, its use is contemplated to be within the scope of this invention.

Exemplary diluents include, but are not limited to, concentrated hydrochloric acid, water, phosphate-buffered saline (pH 6.8-7.6), tris hydrochloride buffer (pH 6.8-7.6), 0.01% sodium azide, and combinations thereof.

In some forms, the composition may also further contain sodium chloride (142-148 mM), potassium chloride (3-7 mM), sodium lactate (28-32 mM), calcium chloride (1.2-2.4 mM), and glucose (5-7 mM).

D. Specific Compositions

In some forms, the disclosed tissue clearing compositions include N-methylglucamine, iohexol, and 2,2'-thiodiethanol, with the concentration of each of these components ranging from 10% to 50%. Preferably, the tissue clearing composition can be composed of 20% N-methylglucamine, 32% iohexol, and 25% thiodiethanol.

In some forms, the disclosed tissue clearing compositions include N-methylglucamine, iohexol, and propylene glycol, with the concentration of each of N-methylglucamine and iohexol ranging from 10% to 50% and the concentration of propylene glycol ranging from 10% to 60%. Preferably, the tissue clearing composition can be composed of 20% N-methylglucamine, 32% iohexol, and 35% propylene glycol.

In some forms, the disclosed tissue clearing compositions include urea, iohexol, and 2,2'-thiodiethanol, with the concentration of urea ranging from 5-50%, and the concentration of each of iohexol and 2,2'-thiodiethanol ranging from 10% to 50%. Preferably, the tissue clearing composition can be composed of 10% urea, 32% iohexol, and 25% 2,2'-thiodiethanol.

In some forms, the homogenizing agent can be 5 to 60%, 5 to 59%, 5 to 58%, 5 to 57%, 5 to 56%, 5 to 55%, 5 to 54%, 5 to 53%, 5 to 52%, 5 to 51%, 5 to 50%, 5 to 49%, 5 to 48%, 5 to 47%, 5 to 46%, 5 to 45%, 5 to 44%, 5 to 43%, 5 to 42%, 5 to 41%, 5 to 40%, 5 to 39%, 5 to 38%, 5 to 37%, 5 to 36%, 5 to 35%, 5 to 34%, 5 to 33%, 5 to 32%, 5 to 31%, 5 to 30%, 5 to 29%, 5 to 28%, 5 to 27%, 5 to 26%, 5 to 25%, 5 to 24%, 5 to 23%, 5 to 22%, 5 to 21%, 5 to 20%, 5 to 19%, 5 to 18%, 5 to 17%, 5 to 16%, 5 to 15%, 5 to 14%, 5 to 13%, 5 to 12%, 5 to 11%, 5 to 10%, 5 to 9%, 5 to 8%, 5 to 7%, 5 to 6%, 6 to 50%, 7 to 50%, 8 to 50%, 9 to 50%, 10 to 50%, 11 to 50%, 12 to 50%, 13 to 50%, 14 to 50%, 15 to 50%, 16 to 50%, 17 to 50%, 18 to 50%, 19 to 50%, 20 to 50%, 21 to 50%, 22 to 50%, 23 to 50%, 24 to 50%, 25 to 50%, 26 to 50%, 27 to 50%, 28 to 50%, 29 to 50%, 30 to 50%, 31 to 50%, 32 to 50%, 33 to 50%, 34 to 50%, 35 to 50%, 36 to 50%, 37 to 50%, 38 to 50%, 39 to 50%, 40 to 50%, 41 to 50%, 42 to 50%, 43 to 50%, 44 to 50%, 45 to 50%, 46 to 50%, 47 to 50%, 48 to 50%, 49 to 50%, 6 to 48%, 6 to 46%, 7 to 46%, 7 to 44%, 8 to 44%, 8 to 42%, 9 to 42%, 9 to 40%, 10 to 40%, 10 to 38%, 11 to 38%, 11 to 36%, 12 to 36%, 12 to 34%, 13 to 34%, 13 to 32%, 14 to 32%, 14 to 30%, 15 to 30%, 15 to 28%, 16 to 28%, 16 to 26%, 17 to 26%, 17 to 24%, 18 to 24%, 18 to 22%, 19 to 22%, 19 to 20%, 10 to 20%, 10 to 19%, 11 to 19%, 11 to 18%, 12 to 18%, 12 to 17%, 13 to 17%, 13 to 16%, 14 to 16%, 14 to 15%, 15 to 25%, 15 to 24%, 16 to 24%, 16 to 23%, 17 to 23%, 17 to 22%, 18 to 22%, 18 to 21%, 19 to 21%, 19 to 20%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, or 5% of the tissue clearing composition.

In some forms, the water-soluble adjusting agent can be 5 to 60%, 5 to 59%, 5 to 58%, 5 to 57%, 5 to 56%, 5 to 55%, 5 to 54%, 5 to 53%, 5 to 52%, 5 to 51%, 5 to 50%, 5 to 49%, 5 to 48%, 5 to 47%, 5 to 46%, 5 to 45%, 5 to 44%, 5 to 43%, 5 to 42%, 5 to 41%, 5 to 40%, 5 to 39%, 5 to 38%, 5 to 37%, 5 to 36%, 5 to 35%, 5 to 34%, 5 to 33%, 5 to 32%, 5 to 31%, 5 to 30%, 5 to 29%, 5 to 28%, 5 to 27%, 5 to 26%, 5 to 25%, 5 to 24%, 5 to 23%, 5 to 22%, 5 to 21%, 5 to 20%, 5 to 19%, 5 to 18%, 5 to 17%, 5 to 16%, 5 to 15%, 5 to 14%, 5 to 13%, 5 to 12%, 5 to 11%, 5 to 10%, 5 to 9%, 5 to 8%, 5 to 7%, 5 to 6%, 6 to 50%, 7 to 50%, 8 to 50%, 9 to 50%, 10 to 50%, 11 to 50%, 12 to 50%, 13 to 50%, 14 to 50%, 15 to 50%, 16 to 50%, 17 to 50%, 18 to 50%, 19 to 50%, 20 to 50%, 21 to 50%, 22 to 50%, 23 to 50%, 24 to 50%, 25 to 50%, 26 to 50%, 27 to 50%, 28 to 50%, 29 to 50%, 30 to 50%, 31 to 50%, 32 to 50%, 33 to 50%, 34 to 50%, 35 to 50%, 36 to 50%, 37 to 50%, 38 to 50%, 39 to 50%, 40 to 50%, 41 to 50%, 42 to 50%, 43 to 50%, 44 to 50%, 45 to 50%, 46 to 50%, 47 to 50%, 48 to 50%, 49 to 50%, 14 to 49%, 14 to 48%, 15 to 48%, 15 to 47%, 16 to 47%, 16 to 46%, 17 to 46%, 17 to 45%, 18 to 45%, 18 to 44%, 19 to 44%, 19 to 43%, 20 to 43%, 20 to 42%, 21 to 42%, 21 to 41%, 22 to 41%, 22 to 40%, 23 to 40%, 23 to 39%, 24 to 39%, 24 to 38%, 25 to 38%, 25 to 37%, 26 to 37%, 26 to 36%, 27 to 36%, 27 to 35%, 28 to 35%, 28 to 34%, 29 to 34%, 29 to 33%, 30 to 33%, 30 to 32%, 31 to 32%, 27 to 37%, 27 to 36%, 28 to 36%, 28 to 35%, 29 to 35%, 29 to 34%, 30 to 34%, 30 to 33%, 31 to 33%, 31 to 32%, 20 to 30%, 20 to 29%, 21 to 29%, 21 to 28%, 22 to 28%, 22 to 27%, 23 to 27%, 23 to 26%, 24 to 26%, 24 to 25%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, or 5% of the tissue clearing composition.

In some forms, the lipid-soluble adjusting agent can be 5 to 70%, 5 to 69%, 5 to 68%, 5 to 67%, 5 to 66%, 5 to 65%, 5 to 64%, 5 to 63%, 5 to 62%, 5 to 61%, 5 to 60%, 5 to 59%, 5 to 58%, 5 to 57%, 5 to 56%, 5 to 55%, 5 to 54%, 5 to 53%, 5 to 52%, 5 to 51%, 5 to 50%, 5 to 49%, 5 to 48%, 5 to 47%, 5 to 46%, 5 to 45%, 5 to 44%, 5 to 43%, 5 to 42%, 5 to 41%, 5 to 40%, 5 to 39%, 5 to 38%, 5 to 37%, 5 to 36%, 5 to 35%, 5 to 34%, 5 to 33%, 5 to 32%, 5 to 31%, 5 to 30%, 5 to 29%, 5 to 28%, 5 to 27%, 5 to 26%, 5 to 25%, 5 to 24%, 5 to 23%, 5 to 22%, 5 to 21%, 5 to 20%, 5 to 19%, 5 to 18%, 5 to 17%, 5 to 16%, 5 to 15%, 5 to 14%, 5 to 13%, 5 to 12%, 5 to 11%, 5 to 10%, 5 to 9%, 5 to 8%, 5 to 7%, 5 to 6%, 6 to 60%, 7 to 60%, 8 to 60%, 9 to 60%, 10 to 60%, 11 to 60%, 12 to 60%, 13 to 60%, 14 to 60%, 15 to 60%, 16 to 60%, 17 to 60%, 18 to 60%, 19 to 60%, 20 to 60%, 21 to 60%, 22 to 60%, 23 to 60%, 24 to 60%, 25 to 60%, 26 to 60%, 27 to 60%, 28 to 60%, 29 to 60%, 30 to 60%, 31 to 60%, 32 to 60%, 33 to 60%, 34 to 60%, 35 to 60%, 36 to 60%, 37 to 60%, 38 to 60%, 39 to 60%, 40 to 60%, 41 to 60%, 42 to 60%, 43 to 60%, 44 to 60%, 45 to 60%, 46 to 60%, 47 to 60%, 48 to 60%, 49 to 60%, 16 to 44%, 16 to 43%, 17 to 43%, 17 to 42%, 18 to 42%, 18 to 41%, 19 to 41%, 19 to 40%, 20 to 40%, 20 to 39%, 21 to 39%, 21 to 38%, 22 to 38%, 22 to 37%, 23 to 37%, 23 to 36%, 24 to 36%, 24 to 35%, 25 to 35%, 25 to 34%, 26 to 34%, 26 to 33%, 27 to 33%, 27 to 32%, 28 to 32%, 28 to 31%, 29 to 31%, 29 to 30%, 25 to 35%, 25 to 34%, 26 to 34%, 26 to 33%, 27 to 33%, 27 to 32%, 28 to 32%, 28 to 31%, 29 to 31%, 29 to 30%, 20 to 30%, 20 to 29%, 21 to 29%, 21 to 28%, 22 to 28%, 22 to 27%, 23 to 27%, 23 to 26%, 24 to 26%, 24 to 25%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 5 to 50%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, or 5% of the tissue clearing composition.

However, as may be understood by those of skill in the art, the components, ranges and subranges of concentrations of any such components may vary depending on the particular application of the tissue clearing composition.

In some forms, the tissue clearing compositions are suitable for most robust, general applications. In some forms, the tissue clearing compositions are suitable for use with long-term fixed human tissues. In some forms, the tissue clearing compositions are suitable or in vivo clearing applications.

In most forms, the disclosed tissue clearing compositions are compatible with, for example, further processing methods or conventional histology and electron microscopy studies, other tissue clearing methods, and different tissue staining methods, such as immunohistochemistry, chemical staining, transgenic cell labelling methods, imaging probes, tissue in situ chemistry, and viral tracing methods.

Separate forms of tissue clearing compositions can be formulated and used for different tissues and source species. In some forms, the compositions are suitable for clearing brain tissue. In some forms, the compositions are suitable for clearing liver tissue. In some forms, the compositions are suitable for clearing human tissues. In some forms, the compositions are suitable for clearing mouse tissues. In some forms, the compositions are suitable for clearing tissues retrieved from archived sources. In some forms, the compositions are suitable for clearing tissues that have been archived for anywhere between 3 months and 50 years. In some forms, the compositions are suitable for clearing tissues that were recently fixed, such as anywhere between 3 weeks to 3 months.

In some forms, the tissue to be cleared can be archived tissue, where the archived tissue has been stored for at least 3 weeks, 4 weeks, 1 month, 5 weeks, 6 weeks, 7 weeks, 8 weeks, 2 months, 9 weeks, 10 weeks, 11 weeks, 12 weeks, 13 weeks, 3 months, 14 weeks, 15 weeks, 16 weeks, 17 weeks, 4 months, 18 weeks, 19, weeks, 20 weeks, 21 weeks, 5 months, 22 weeks, 23 weeks, 24 weeks, 25 weeks, 26 weeks, 6 months, 27 weeks, 28 weeks, 29 weeks, 30 weeks, 7 months, 31 weeks, 32, weeks, 33 weeks, 34 weeks, 8 months, 35 weeks, 36 weeks, 37 weeks, 38 weeks, 39 weeks, 9 months, 40 weeks, 41 weeks, 42 weeks, 43 weeks, 10 months, 44 weeks, 45 weeks, 46 weeks, 47 weeks, 11 months, 48 weeks, 49 weeks, 50 weeks, 51 weeks, 52 weeks, 12 months, 1 year, 13 months, 14 months, 15 months, 16 months, 17 months, 18 months, 19 months, 20 months, 21 months, 22 months, 23 months, 24 months, 2 years, 30 months, 36 months, 3 years, 42 months, 48 months, 4 years, 54 months, 60 months, 5 years, 6 year, 7 years, 8 years, 9 years, 10 years, 11 years, 12 years, 13 years, 14 years, 15 years, 16 years, 17, years, 18 years, 19 years, 20 years, 22 year, 24 years, 25 years, 26 years, 28 years, 30 years, 35 years, 40 years, or 50 years.

However, as will be understood by one of skill in the art, the timeframe for tissue fixation prior to application of the disclosed tissue clearing compositions may vary, and, as such, is not limited to above identified timeframes.

It is also to be understood that use of the compositions disclosed herein is not limited to above identified tissues, sources, or source species, and, as such, may vary.

III. Kits

The disclosed tissue clearing compositions, as well as other materials can be packaged together in any suitable combination as a kit useful for performing, or aiding in the performance of, the disclosed method. It is useful if the kit components in a given kit are designed and adapted for use together in the disclosed method.

The disclosed compositions can include additional components that, for example, make the composition useful or tailored for specific tissues and source species to which it is to be applied. In some forms, the disclosed tissue clearing compositions are composed of three core components; (1) a homogenizing agent, (2) a cytoplasmic, water-soluble RI adjusting agent, and (3) a membrane, lipid-soluble RI adjusting agent.

In some forms, the tissue clearing kit can include a composition having 10% urea, 25% 2,2'-thiodiethanol, and 32% iohexol. In some forms, the kit can include a composition having 20% N-methylglucamine, 25% thiodiethanol, and 32% iohexol. In some forms, the kit can include a composition having 20% N-methylglucamine, 35% propylene glycol, and 32% iohexol. However, as will be understood by those of skill in the art, the components, ranges and subranges of concentrations of any such components in a particular kit may vary depending on the particular application of the tissue clearing composition.

Separate compositions are provided for different tissues and source species. In some forms, the compositions are suitable for clearing brain tissue. In other forms, the compositions are suitable for clearing liver tissue. In some forms, the compositions are suitable for clearing human tissues. In other forms, the compositions are suitable for clearing mouse tissues. In some forms, the compositions are suitable for clearing tissues retrieved from archived sources. In some forms, the compositions are suitable for clearing tissues that have been archived for anywhere between 3 months and 50 years. In other forms, the compositions are suitable for clearing tissues that were recently fixed, such as anywhere between 3 days to 3 months. In some forms, the compositions are suitable for most robust, general applications. In some forms, the compositions are suitable for in vivo clearing applications. However, as may be understood by one of skill in the art, the timeframe for tissue fixation prior to application of the disclosed compositions may vary, and, as such, is not limited to above identified timeframes.

In some forms, the disclosed kits can also include 10% w/v sodium azide solution, 10× concentrate of phosphate-buffered saline, phosphate-buffered saline with 0.1% Triton X-100 and 0.01% sodium azide, 4% w/v sodium dodecyl sulphate in 0.2 M sodium borate buffer at pH 8.5, 8% w/v sodium dodecyl sulphate in phosphate-buffered saline at pH 7.4.

IV. Methods of Using

A. RI Homogenization with the Tissue Clearing Composition

The present disclosure also encompasses a method for rendering a biomaterial of a subject transparent. In some forms, the method can include the single step of incubating a sample tissue in a suitable tissue clearing composition as described herein at a particular temperature for a sufficient period of time. Incubation may occur at a temperature ranging from about 37° C. to about 55° C. for a time period ranging from 3 hours to 24 hours. Preferably, the sample is incubated in the tissue clearing composition for 6 hours at 37° C.

Human or rodent tissues that are chemically fixed with formalin, or that are formal in-fixed, paraffin-embedded (FFPE), can be retrieved; such as by rehydration through a series of organic solvents and washing methods, and preparation for subsequent "SDS Treatment". SDS-treatment involves the partial delipidation of the prepared tissue for subsequent labelling. This can be achieved by immersing the prepared tissue into 4% or 8% SDS in a certain buffer, followed by incubation at a certain temperature, allowing for permeabilization and partial delipidation.

In some forms, the sample tissue is incubated in a tissue clearing composition that includes N-methylglucamine, iohexol, and 2,2'-thiodiethanol, where the concentration of each of these components ranges from 10% to 50%. Preferably, the sample tissue is incubated in a tissue clearing composition containing 20% N-methylglucamine, 32% iohexol, and 25% thiodiethanol.

In other forms, the sample tissue is incubated in a tissue clearing composition that includes N-methylglucamine, iohexol, and propylene glycol, where the concentration of each of N-methylglucamine and iohexol ranges from 10% to 50% and the concentration of propylene glycol ranges from 10% to 60%. Preferably, the sample tissue is incubated in a tissue clearing composition containing 20% N-methylglucamine, 32% iohexol, and 35% propylene glycol.

In still other forms, the sample tissue is incubated in a tissue clearing composition that includes urea, iohexol, and 2,2'-thiodiethanol, where the concentration of urea ranges from 5-50%, and the concentration of each of iohexol and 2,2'-thiodiethanol ranges from 10% to 50%. Preferably, the sample tissue is incubated in a tissue clearing composition containing 10% urea, 32% iohexol, and 25% 2,2'-thiodiethanol.

However, as may be understood by those of skill in the art, the sample tissue may be incubated in compositions whose components, ranges and subranges of concentrations of any such components vary depending on the tissue and particular application. The sample tissue may be a tissue or an organ of a plant or an animal, preferably a tissue or an organ of an animal, such as insects, fishes, amphibians, birds, and mammals; and more preferably, a tissue or an organ of a mammal. The mammal may include but is not limited to, laboratory animals such as mice, rats, rabbits, guinea pigs, and primates; pet animals such as dogs and cats; farm animals such as cows, horses, sheep; and humans. Preferably, the tissue or organ is derived from a human. According to certain embodiments of the present disclosure, the biomaterial is the brain, heart, stomach, pancreas, intestine, liver, lung and ear of a mouse as well as the head of a fly, or a bio-engineered collagen scaffold.

B. Tissue Staining and Processing with the Tissue Clearing Composition

Figure 7:
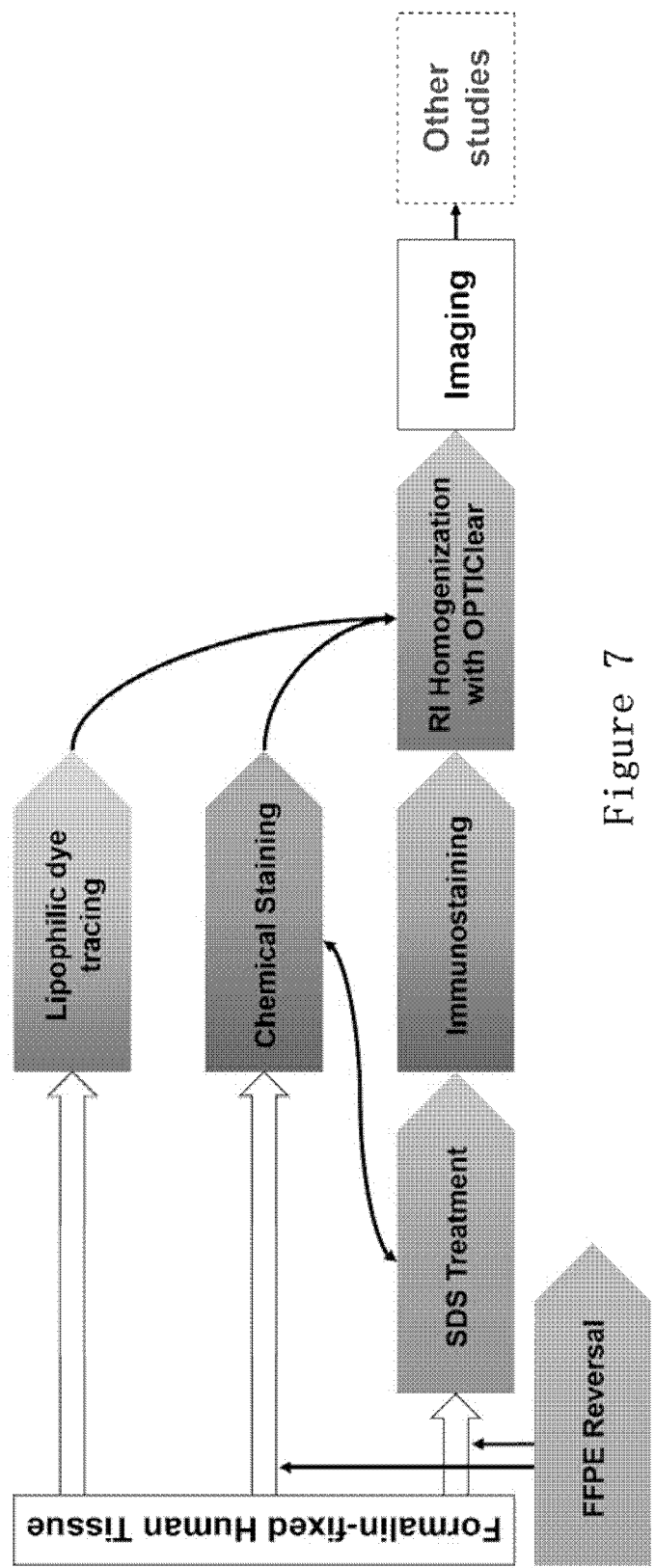
FIG. 7 illustrates an exemplary protocol for tissue staining and processing with an example of the disclosed tissue clearing compositions.

The sample tissue may be pre-labeled with an imaging tracer that is either a dye, a fluorescent protein, or an antibody, so that the imaging tracer may be traced under a microscope, preferably by a confocal microscope, after the sample tissue is subjected to clear treatment and becomes transparent. An exemplary protocol for tissue staining and processing is illustrated in FIG. 7.

In some forms, human or other tissue that has been fixed in formalin for one year or longer may be retrieved and subjected to various processing steps, such as rehydration through a series of organic solvents and washing methods, and preparation for subsequent "SDS Treatment." SDS treatment involves the partial delipidation of the prepared tissue in the previous steps for subsequent labelling of the tissue. Technically, this is achieved by immersing the prepared tissue into 4% or 78% SDS in a certain buffer and incubation at a certain temperature that allows permeabilization and partial delipidation of the tissue.

In some forms, the retrieved archived tissue is subjected to lipophilic dye tracing. DiI and CM-DiI dyes may be directly applied to non-SDS treated human brain tissues that have been fixed with formalin for 1 year. Tissues can subsequently be cleared with the tissue clearing composition and visualized in 3D using various imaging methods, such as by differential interference contrast, confocal microscopy, light sheet microscopy, ultramicroscopy, stochastic optical reconstruction microscopy, photoactivated localization microscopy, structured illumination microscopy, ground state depletion microscopy, stimulated emission depletion microscopy, scanning electron microscopy, transmission electron microscopy, wide-field fluorescence microscopy, conventional transmitted light microscopy, dissecting microscopy, spectrophotometry, fluorescence plate detection and fluorescence chip detection, etc.

In other forms, the retrieved archived tissue is subjected to chemical staining. These chemical stains may include but are necessarily limited to 3D Nissl staining, 3D Amyloid staining, or Morph488 staining.

In 3D Nissl Staining, cresyl violet may be applied to tissue in conjunction with a binding kinetics controller. In some forms, the tissue may be formalin-fixed, paraffin-embedded (FFPE). In some forms, it may be delipidated, or non-delipidated. High signal-to-noise ratio staining and a reduction in nonspecific staining may be achieved by subsequent regression of the tissue in acid alcohol solution. In some forms, the tissue may subsequently be cleared by RI homogenization with the tissue clearing composition and visualized in 3D using various imaging methods. In some forms, the method is compatible with subsequent 3D immunohistochemistry.

In 3D Amyloid Staining, the amyloid stain thioflavin S may be applied in ethanolic solution to tissue that may be either FFPE-retrieved, delipidated, or non-delipidated. In some forms, the tissue may subsequently be cleared by RI homogenization with the tissue clearing composition and visualized in 3D using various imaging methods. In some forms, the method is compatible with subsequent 3D immunohistochemistry.

In Morph488 Staining, a dye synthesized by combining a peptide and maleimide-AlexaFluor488 may be applied to tissue that may be either FFPE-retrieved, delipidated, or non-delipidated. In some forms, the tissue may subsequently be cleared by RI homogenization with the tissue clearing composition and visualized in 3D using various imaging methods. In some forms, the method is compatible with subsequent 3D immunohistochemistry.

In other forms, the retrieved archived tissue is subjected to immunostaining using any suitable antibodies. In some forms, antibodies may be applied in high dilutions in a sequential manner, allowing them to penetrate further into the tissue. In other forms, antibodies may be applied in low dilutions in a single step in addition to a binding kinetics controller, facilitating its penetration into the tissue. In some forms, immunostaining techniques may be applied with or without signal amplification techniques. In some forms, immunostaining techniques may be done in conjunction with other preparation processes, as well as subsequent methodologies.

C. Applications

In some forms the disclosed methods are applicable to plants. In other forms the disclosed methods are applicable in the fields of neuroscience and neuropathology. Preferably the disclosed methods are applicable to a tissue or an organ of an animal, such as insects, fishes, amphibians, birds, and mammals;

and more preferably, a tissue or an organ of a mammal. The mammal may include but is not limited to, laboratory animals such as mice, rats, rabbits, guinea pigs, and primates; pet animals such as dogs and cats; farm animals such as cows, horses, sheep; and humans. Preferably, the tissue or organ is derived from a human. According to certain embodiments of the present disclosure, the tissue sample is the brain, heart, stomach, pancreas, intestine, liver, lung and ear of a mouse as well as the head of a fly, or a bio-engineered collagen scaffold.

In some forms, the disclosed methods are applicable to clinicopathological studies as well as trials for routine clinical use for improved patient diagnoses of diseases, such as cancer and autoimmune diseases.

EXAMPLES

Example 1. Simulation of Opaqueness

To understand how clearing agents work, it is important to have a novel view of the physical basis of opaqueness. The easiest model is a layer of oil on top of a layer of water. Both media are transparent, however, light bends as it passes through the boundary due to their differences in RI, leading to a perceived boundary. Therefore, it was hypothesized that should one adjust the RI of each medium to a defined value such that they are equal to each other. Accordingly, there should be no bending in light paths, and no perceived boundary can be seen (FIG. 1).

In tissues, there is an inhomogeneous mix of water and oil, and this can be viewed as oil and water if the vial were rigorously shaken, as one would see an emulsion as opaque. If one were able to selectively adjust the aqueous and lipid compartments to a certain RI that are equal to each other, the emulsion would still be transparent. That is, the emulsion would be optically homogeneous, despite the fact that it would still be physically inhomogeneous. This can be easily proved experimentally by repeating the shaking oil-water experiment, but with the RI of water (1.33) adjusted to a higher value using glycerol to match that of chloroform (1.45), where even after shaking, the emulsion is still transparent.

Figure 2:
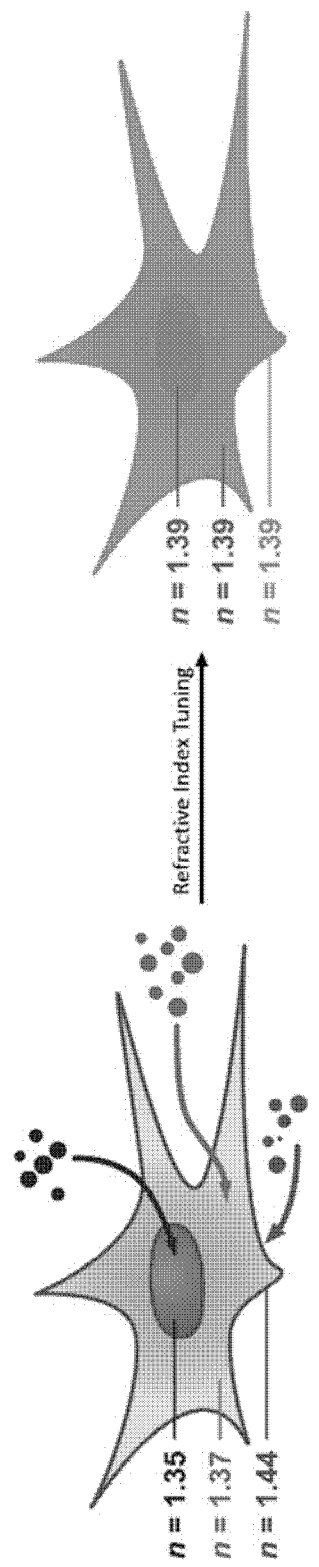
FIG. 2 is a scheme depicting the clearing effect in the cell. Tuning refractive indices of different cellular compartments (such as that of the nucleus, and that of the cytoplasm) by selectively solubilizing chemicals in them leads to a minimally-destructive, high-efficacy tissue clearing effect.
Figure 3:
FIG. 3 is a scheme depicting RI homogenization assisted by protein denaturation. Apart from selective solubilization of RI-adjusting chemicals (indicated by dark grey spheres dispersed throughout the illustration), a mild additive (depicted by light grey spheres) can be added to facilitate the optical homogenization process. Such an additive can be, for example, a denaturant indicated by the spheres to the right of the arrow at the bottom of the let panel. This allows for better physical homogenization, leading to more effective clearing.

Accordingly, the use of a lipid-soluble membrane RI adjusting agent plus an aqueous cytoplasmic RI adjusting agent can lead to optical homogenization of the two major physical compartments within the tissue (FIG. 2). During the course of this experiment, it was noted that the cytoplasmic RI adjusting agent might not physically appose closely enough to the proteins, leading to a certain aspect of physical inhomogeneity that impedes optical homogenization. This explains why all currently existing tissue clearing formulae used denaturants to achieve better clearing effect (e.g. urea in ScaleA2 and ScaleS; formamide in Clear$^T$; SDS in CLARITY™). However, it was reasoned that "denaturation" might not be necessary if physical homogeneity good enough for optical homogenization could be achieved. This would aid in avoiding the side effects of tissue and antigen destruction, tissue expansion, and the incompatibility with lipophilic tracers commonly associated with denaturation (note that 70% of the cell membrane dry mass in neurons are proteins instead of lipids). A screen for mild protein "segregation agents" using boiled egg white revealed several candidates, the safest and least toxic of which was N-methylglucamine. The concept of the homogenizing agent is illustrated in FIG. 3, where the RI-adjusting agent can be facilitated (by the curly structures) to closely appose to the macromolecules, achieving optical homogenization at the molecular scale.

Example 2. Generation of the Tissue Clearing Composition

The tissue clearing compositions denoted herein as "OPTIClear" are composed of three core components:

(1) a homogenizing agent (such as N-methylglucamine (NMG), urea, or ethylenediamine);

(2) a cytoplasmic, water-soluble RI adjusting agent (such as iohexol, sodium thiosulfate, or polyethylene glycol);

(3) a membrane, lipid-soluble RI adjusting agent (such as 2,2'-thiodiethanol (TDE) or propylene glycol).

Based on previous observations, these three components are necessary for the best clearing effect. These three components can vary in their exact composition and chemicals, depending on the tissue to be cleared and the state of the tissue (in vivo, fresh, or archived), in order to achieve the desired tissue clearing effect.

Tissue clearing compositions validated for human brain tissues are listed in Table 3.

TABLE 3

| Validated OPTIClear Compositions | Recommended Applications |
| --- | --- |
| 10% urea, 25% TDE, 32% Iohexol | Long-fixed human tissues |
| 20% NMG, 25% TDE, 32% Iohexol | Most robust, general applications |
| 20% NMG, 25% TDE, 32% Iohexol | In vivo clearing applications |
| 20% NMG, 35% propylene glycol, 32% Iohexol | In vivo clearing applications |

The composition that provided the best results (20% NMG; 25% IDE; 32% Iohexol) was used for pilot testing in animals and human tissues to test the efficacy of the above listed compositions.

Although the concentrations of the individual chemicals can vary, it was found that best clearing was achieved when the concentration of homogenizing agent was at least 20% for N-methylglucamine and 10% for urea. It should be noted however, that homogenizing agents tend to compromise tissue integrity or fluorescent protein signal intensities at higher concentrations. Cytoplasmic (water-soluble) RI adjusting agents work better at higher concentrations in tissues which are deficient in lipids but which have a high RI; tissues such as the liver, kidney, or muscle. Conversely, lipid rich tissues require a lower cytoplasmic/membrane RI adjusting agent ratio, while the homogenizing agent of choice in these tissues would be urea or sodium dodecyl sulphate.

Tissues were incubated at 37° C. in any one of above-disclosed compositions for up to 6 hours. 5 mm-thick human tissues delipidated in 4% SDS for 3 months at 55° C. and still showing significant opacity were successfully cleared in any of the above disclosed tissue clearing compositions in 6 hours at 37° C.

Example 3. RI Homogenization with Tissue Clearing Composition

A chemical reagent was generated, containing N-methylglucamine, iohexol, 2,2'-thiodiethanol, concentrated hydrochloric acid, and water, in a definite ratio. Immersion of thick tissues, such as archived, FFPE-retrieved, delipidated, non-delipidated, chemical stained, non-chemical stained, immunostained, non-immunostained tissues, would turn visibly more transparent than their native state when immersed in this formula at various temperatures for at least one hour.

Example 4. Optical Clearing after Lipophilic Dye Tracing Staining

DiI and CM-DiI were directly applied to non-SDS treated human brain tissues that had been fixed with formalin for ≥1 year. Neurons could subsequently be visualized in 3D after RI homogenization with tissue clearing composition. The clarity of the fibers allowed for the visualization of multiple rosettes and dendritic spines.

Example 5. Optical Clearing after Chemical Staining

Chemical labeling of human brain tissues fixed with formalin for ≥1 year was done by 3D Nissl staining, 3D amyloid staining, and Morph488 staining.

In 3D Nissl Staining, cresyl violet, the usual Nissl stain in thin tissue sections, was applied in conjunction with a binding kinetics controller to stain a thick piece of tissue that was either archived, FFPE-retrieved, delipidated, or non-delipidated. Subsequent regression in acid alcohol solution achieved high signal-to-noise ratio staining and reduced nonspecific staining. This allowed for visualization of neurons in 3D for cell counting studies. The method is also compatible with subsequent 3D immunohistochemistry.

In 3D Amyloid Staining, the usually amyloid stain thiolavin S was applied in ethanolic solution to a thick piece of tissue that was either archived, FFPE-retrieved, delipidated, or non-delipidated. This protocol can be combined with subsequent 3D immunohistochemistry and visualization in 3D when cleared in RI homogenization with tissue clearing composition.

In Morph488 Staining, a dye synthesized by combining a peptide and maleimide-AlexaFluor488 was applied to a thick tissue that was either archived, FFPE-retrieved, delipidated, or non-delipidated. This allowed for global staining of the cytoplasm and facilitated the visualization of the fine architecture of a tissue in 3D when cleared in RI homogenization with tissue clearing composition.

Example 6. Optical Clearing after Immunostaining

Human brain tissues fixed with formalin for ≥1 year were immunostained involving two alternative protocols for the deep penetration of antibodies, with or without signal amplification techniques.

In the Less-is-More method, the antibody was applied in high dilutions in a sequential manner, allowing them to penetrate further into the tissue. In the Binding Kinetics Control method, the antibody was applied in low dilutions in a single step in addition to a binding kinetics controller, which facilitated its penetration into the tissue. Both methods were done in conjunction with other preparation processes, as well as subsequent methodologies.

A sample tissue that had been archived in formalin for 50 years and delipidated for 4 months was cleared with tissue clearing composition. The tissue was then labeled with antibodies against glial fibrillary acidic protein, showing deep penetration of antibodies down to 300 µm using the Less-is-More method. FFPE tissues can be retrieved and processed using above disclosed methods. Tissues are subsequently cleared using any of above disclosed validated compositions to allow three-dimensional visualization of brain structures, such as with antibodies against neurofilament and the nuclear stain DAPI, with minimal morphology disturbance compared to the control. Fine tissue that was either archived, FFPE-retrieved, delipidated, or non-delipidated. Subsequent regression in acid alcohol solution achieved high signal-to-noise ratio staining and reduced nonspecific staining. This allowed for visualization of neurons in 3D for cell counting studies. The method is also compatible with subsequent 3D immunohistochemistry.

In 3D Amyloid Staining, the usually amyloid stain thiolavin S was applied in ethanolic solution to a thick piece of tissue that was either archived, FFPE-retrieved, delipidated, or non-delipidated. This protocol can be combined with subsequent 3D immunohistochemistry and visualization in 3D when cleared in RI homogenization with tissue clearing composition.

In Morph488 Staining, a dye synthesized by combining a peptide and maleimide-AlexaFluor488 was applied to a thick tissue that was either archived, FFPE-retrieved, delipidated, or non-delipidated. This allowed for global staining of the cytoplasm and facilitated the visualization of the fine architecture of a tissue in 3D when cleared in RI homogenization with tissue clearing composition.

Example 6. Optical Clearing after Immunostaining

Human brain tissues fixed with formalin for ≥1 year were immunostained involving two alternative protocols for the deep penetration of antibodies, with or without signal amplification techniques.

In the Less-is-More method, the antibody was applied in high dilutions in a sequential manner, allowing them to penetrate further into the tissue. In the Binding Kinetics Control method, the antibody was applied in low dilutions in a single step in addition to a binding kinetics controller, which facilitated its penetration into the tissue. Both methods were done in conjunction with other preparation processes, as well as subsequent methodologies.

Figure 4:
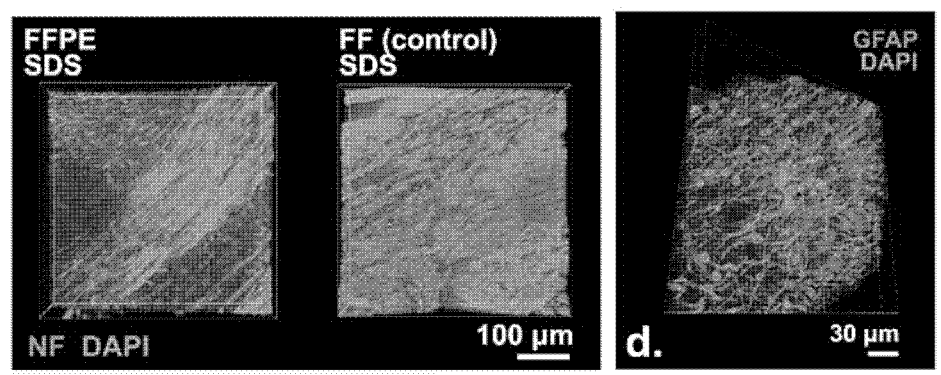
FIG. 4 shows that FFPE tissues can be retrieved and processed with our methodologies and cleared using OPTI-Clear to allow three-dimensional visualization of brain structures (demonstrated on the left two images with antibodies against neurofilament and the nuclear stain DAPI), with minimal morphology disturbance compared to the control. Fine structural details were also preserved at higher magnifications (GFAP, d.).

A sample tissue that had been archived in formalin for 50 years and delipidated for 4 months was cleared with tissue clearing composition. The tissue was then labeled with antibodies against glial fibrillary acidic protein, showing deep penetration of antibodies down to 300 µm using the Less-is-More method. FFPE tissues can be retrieved and processed using above disclosed methods. Tissues are subsequently cleared using any of above disclosed validated compositions to allow three-dimensional visualization of brain structures, such as with antibodies against neurofilament and the nuclear stain DAPI, with minimal morphology disturbance compared to the control. Fine structural details were also preserved at higher magnifications (FIG. 4). Electron micrographs showed that the samples treated with the disclosed validated compositions maintained intact subcellular structure, compared to control tissues immersed in PBS.

Example 7. Role of Acrylamide is Insignificant in Three-Dimensional Histological Imaging The following example utilizes the tissue clearing technique hereater referred t as "CLARITY™". CLARITY™ features the use of detergents to remove lipids from fixed tissues to achieve optical transparency.

Materials and Methods

Chemicals and Reagents

Acrylamide (VWR BDH Prolabo, Electranl 40% w/v solution, catalogue number 443545P) and bisacrylamide (national diagnostics, 2% w/v solution, Protein and Sequencing Electrophoresis grade, catalogue number EC-820) were checked for any discoloration to ensure purity and was used as received. VA-044 Thermal initiator (Wako chemicals) was used as received.

Antibodies

The antibodies used in this study are listed in Table 4.

TABLE 4

Antibodies used in this study.

| Antibody | Company, Catalog Number (Lot Number) |
| --- | --- |
| Anti-MAP2, rabbit polyclonal | Millipore AB5622 (2202428) |
| Anti-Neurofilament, mouse monoclonal | Dako, M0762 (1495837) |
| Anti-P-Tubulin III, mouse monoclonal | Sigma, T8660 (082M4845) |
| Anti-Tyrosine Hydroxylase, rabbit polyclonal | Millipore, AB152 (2458991) |
| Donkey anti-Goat IgG, AlexaFluor1488 conjugate | Invitrogen, A11055 (1463163) |
| Donkey anti-Mouse IgG, AlexaFluor1488 conjugate | Invitrogen, A21202 (1644644) |
| Donkey anti-Rabbit IgG, AlexaFluor1568 conjugate | Invitrogen, A10042 (1020757) |
| Donkey anti-Mouse IgG, AlexaFluor1568 | Invitrogen, A10037 (1495837) |
| Goat anti-Rabbit IgG, AlexaFluor1594 | Invitrogen, A11012 (1515530) |

Animals

All animals used in this study were approved and handled in accordance with the guidelines provided by the Committee on the Use of Live Animals in Teaching and Research (CULATR) in the Laboratory Animal Unit, HKU with approval (CULATR reference number: 3699-15). All mouse brain tissues were harvested immediately after euthanasia using intraperitoneal sodium pentobarbital (150 mg/kg), flushed clean with normal saline, perfusion fixed with 4% PBS-buffered PFA for 10 minutes, and immersed in the same fixation solution for at least 2 days (to up to 9 months, as individually specified for each sample) at 4° C. before proceeding to the CLARITY™ procedure.

Human Samples

Human brain tissues used in this study was provided by the Parkinson's UK Tissue Bank at Imperial College London, which have all been fixed in 10% buffered formalin for at least 3 weeks before proceeding to CLARITY™.

Model Protein Reaction for Clearing Procedure

Lysozyme (10 mg) was dissolved in 1×PBS buffer (500 µL) containing formaldehyde (4%). The mixture was shaken at room temperature for 15 minutes. 38 (µL of acrylamide-bisacrylamide (37.5:1) solution 30% was added to the above mixture to a final acrylamide concentration of 4%. For the control experiment, 38 µL of 1×PBS was added instead. The reaction mixture was incubated at 4° C. for 1 day. The reaction progress was monitored by LC-MS.

Protein Mass Spectrometry

Liquid chromatography-mass spectrometry (LC-MS) was performed on a Micromass LCT (ESI-TOF-MS) coupled to a Waters Alliance 2790 HPLC using a Phenomenex Jupiter C4 column (250×4.6 mm×5 µm). Water:acetonitrile, 95:5 (solvent A) and acetonitrile (solvent B), each containing 0.1% formic acid, were used as the mobile phase at a low rate of 1.0 mL min-1. The gradient was programmed as follows: 95% A (5 min isocratic) to 100% B after 15 min then isocratic for 5 min. The electrospray source of LCT was operated with a capillary voltage of 3.2 kV and a cone voltage of 25 V. Nitrogen was used as the nebulizer and desolvation gas at a total low of 600 L hr-1. Spectra were calibrated using a calibration curve constructed from a minimum of 17 matched peaks rom the multiply charged ion series of equine myoglobin, which was also obtained at a cone voltage of 25V. Total mass spectra were reconstructed from the ion series using the MaxEnt algorithm preinstalled on MassLynx software (v. 4.0 from Waters) according to manufacturer's instructions.

Passive CLARITY™

The available protocol was followed except for several points: (1) omission of acrylamide and bisacrylamide in the hydrogel monomer solution for our experiments, which were replaced with water; (2) use of 8% SDS in 1×PBS instead of Sodium borate clearing buffer (SBC) in some of the experiments specified above; (3) for refractive index-matching, Histodenz-RIMS was used for mouse brain, and 47% 2,2'-Thidiethanol in 10 mM phosphate buffer was used for human brain tissues.

Electrophoretic Tissue Clearing (ETC)

A ETC setup was self-constructed using a lunchbox, platinum wires, DC power supply, a fish tank water pump, and a water bath. The temperature, pH of the clearing buffer, running voltage and current, were all monitored hourly and kept stable by manual adjustments.

Conventional Histology

Clarified tissues (acrylamide-embedded or non-embedded) were dehydrated in an automatic processor and embedded in paraffin, and sectioned at 20-µm thickness using a microtome. Hematoxylin & Eosin staining was performed according to the Standard Operating Procedures provided by the Parkinson's UK Tissue Bank (Procedure number MSP-S-033 and MSP-S-034, respectively). Briefly, tissues were stained in Meyer's hematoxylin for 5 min, washed in hard tap water for 5 min, stained in eosin for 5 min, washed very briefly in water, and dehydrated through series of ethanol and xylene before mounting in Paramount.

Immunohistochemistry

All antibodies were used at 1:100 dilutions in PBST with 0.01% w/v NaN3. Samples were stained at 37° C. for 2 days. Sequential staining was employed for double immunohistochemistry. DAPI was added to a final concentration of 1 ng/ml when desired from a stock of 1 mg/ml in DMSO.

Confocal Imaging

Imaging was performed using a Leica SP5 Confocal Microscope (objectives used: HCX PL APO CS 10.0× (NA 0.40) DRY UV, HCX PL APO CS 20.0× (NA 0.70) DRY UV, and HCX PL APO 40.0× (NA 0.85)), and a Carl Zeiss LSM 780 Confocal Microscope (objectives used: EC Plan-Neofluar 5× (NA 0.16) Ph1 M27, Plan-Apochromat 10× (NA 0.45) Ph1 M27, Plan-Apochromat 20× (NA 0.8) Ph2 M27, Plan-Apochromat 40× (NA 1.4) Oil DIG M27, Plan-Apochromat 100× (NA 1.40) Oil Ph3 M27).

Confocal Image Analysis

Confocal image maximum intensity projections and Z-depth color-coding were performed using Fiji and Zen Black software, 3D renderings were performed using Imaris 7.2.3. Scanning electron micrographs were cropped and contrast-adjusted using Adobe Ater Effects CS6 software.

Scanning Electron Microscopy

Samples were processed according to the standard procedures provided by the Electron Microscopy Unit of the University of Hong Kong (http://www.emunit.hku.hk/documents/SamplePreparationTechnique.pdf, page 27, starting from step 6). Briefly, samples were dehydrated in a series of ethanol concentrations, dried in a BAL-TEC CPD 030 Critical Point Dryer using liquid carbon dioxide as transitional fluid, and gold-coated using a BAL-TEC SCD 005 Sputter Coater/Carbon Coater. Images were acquired using a Hitachi S-4800 PEG scanning electron microscope and a LEO 1530 PEG scanning electron microscope.

Protein Assay and SDS-PAGE

The Bradford assay (ThermoScientific #1856209) was employed for rapid protein measurement in sample aliquots, absorbance at 595 nm was measured using a UV spectrophotometer (Perkin Elmer Victor3 1420 Multilabel Counter) in a 96-well plate. SDS-PAGE was performed using 6% stacking gel and 15% separating gel, ran at 120 V for approximately 2.5 hours, and stained with 1% Coomassie Brilliant Blue 250R in destaining buffer overnight. The stained gels were destained in destaining buffer (1:4:5 acetic acid:methanol:water) until no background blue hue was observed. The gels were then photographed using a digital camera.

Protease Digestion

1% acrylamide-embedded, cleared mouse brain slices of 2 mm thick were digested separately with Proteinase K, 0.1 mg/ml in PBST; or Clostridium histolyticum Collagenase (Sigma C0130-100MG, lot. no. SLBJ7761V), 0.1 mg/ml in PBS with 0.018 mM $CaCl_2$ at 37° C. overnight.

Results

Figure 5:
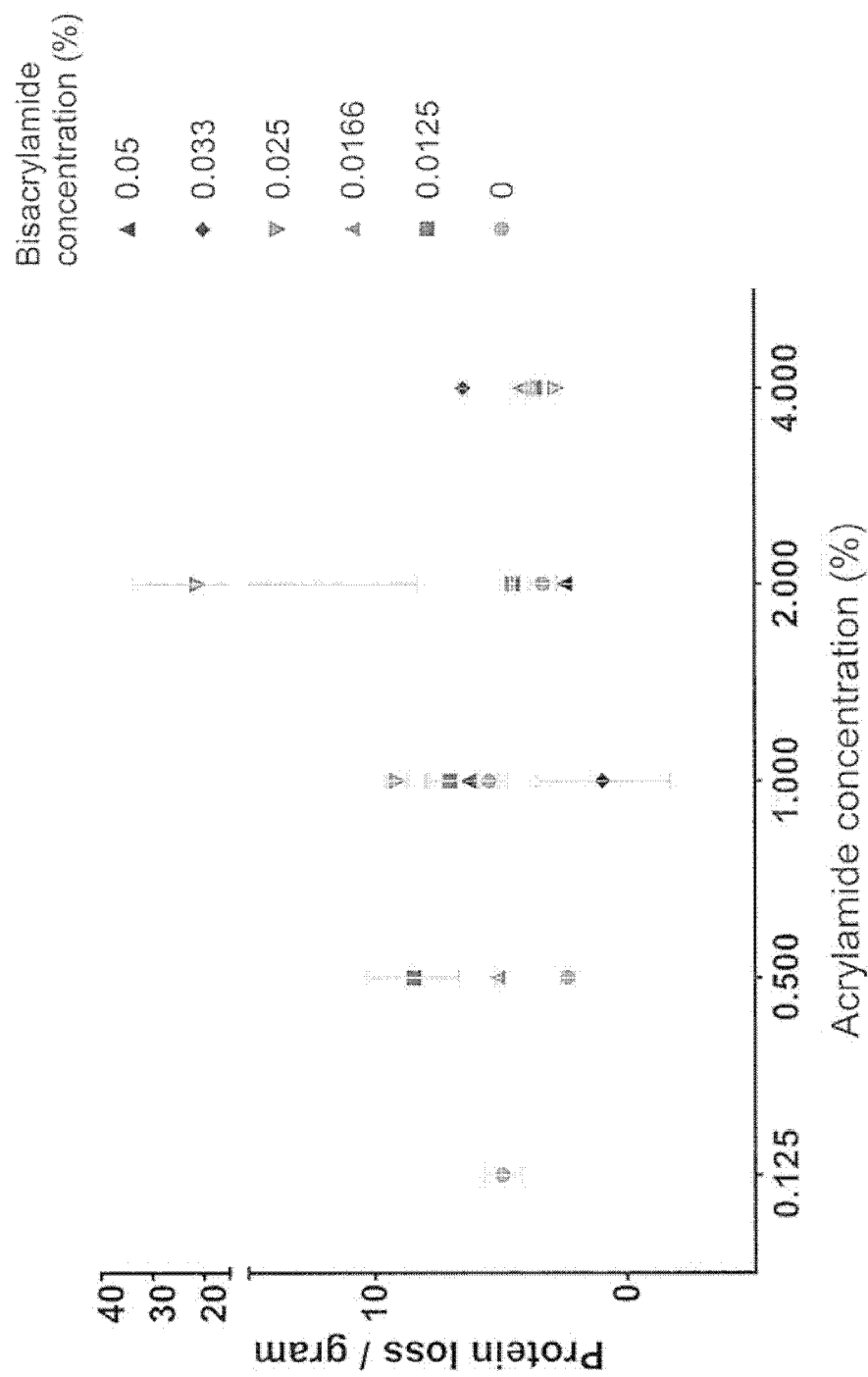
FIG. 5 is a graph showing the amount of protein leaked from delipidation per grain of tissue embedded in various formulae of acrylamide.

Observation of SDS-mediated delipidation of hydrogel-embedded and non-embedded tissues revealed that that non-embedded tissues can be cleared without the significant tissue expansion seen in hydrogel-embedded tissues. Moreover, the time taken to adequately delipidate a tissue block depended largely on the conditions of formaldehyde fixation instead of the concentration of acrylamide used for embedding (data not shown), and the usage of ETC did not alter the time course of tissue clearing. Importantly, the preservation of structural integrity of tissues during SDS-mediated delipidation depended more on the formaldehyde fixation conditions, but little on whether acrylamide embedding had been performed. 2 mm weighed slices of mouse brains (fixed for 2 days) were cleared at 37° C. in 5 ml of 8% SDS in PBS after being embedded in various compositions of acrylamide/bisacrylamide. Next, the acrylamide/bisacrylamide/formaldehyde combinations used for embedding were systematically varied and the amount of protein loss from tissues was quantified using the Bradford assay and SDS-PAGE analysis. Interestingly, there was a poor correlation between the embedding composition used and the amount of protein loss (FIG. 5).

Cleared tissue morphologies were evaluated under the microscope, where all samples had been fixed or at least 2 days at room temperature. Under the same conditions, non-embedded, 2%, and 4% acrylamide-embedded tissues showed little difference in terms of neural tissue morphology in paraffin-embedded sections stained with hematoxylin and eosin after SDS-delipidation. Immunostaining for neurofilament (a filamentous, insoluble protein), tyrosine hydroxylase, microtubule-associated protein 2, choline acetyltransferase, and βIII-tubulin (globular, soluble proteins) showed that the non-embedded samples are not inferior to the embedded ones in terms of staining intensities and qualities. Perhaps because the non-embedded samples are less swollen, TH-positive fibers are clearer and appear to be less fragmented. In all cases, the antibody penetration was limited due to rapid consumption of antibodies by the dense antigens in tissues. This was made worse in 4% acrylamide-embedded samples because the hydrogel imposed further restriction to diffusion. Comparison using Thy1-GFP line transgenic mouse brain slices also suggests that acrylamide is unnecessary for preserving endogenous fluorescence.

Figure 6A:
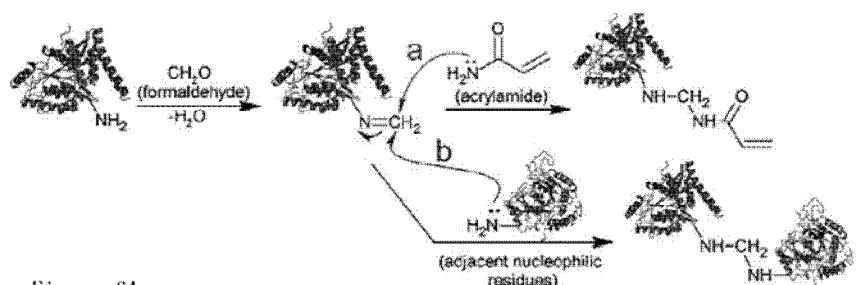
FIGS. 6A-6E are schemes depicting the chemistry background of the CLARITY™ tissue hydrogel.
Figure 6B:
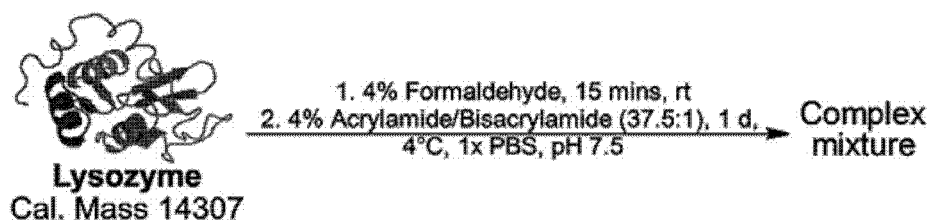

At the ultrastructural level, scanning electron micrographs (SEMs) showed no difference in the surface morphology between embedded and non-embedded samples that were fixed, cleared, and processed under the same conditions. Neurons and neuritis were clearly visible in all cases, with good preservation of tissue ultrastructure and cellular morphology. The polyacrylamide gel itself was seen as a porous matrix on the surface of the 4% acrylamide-embedded sample. Above comparisons provided evidence that acrylamide plays a relatively insignificant role in situ in CLARITY™. A review of the literature provided an inconclusive argument as to whether the proposed acrylamide nitrogen can indeed function as a nucleophile to attack the formaldimines as proposed in CLARITY™ (FIG. 6A, path a), possibly due to the different reaction conditions employed. To see if acrylamide can significantly modify a protein in the presence of formaldehyde and under the conditions employed in CLARITY™, a model reaction with protein mass spectrometry was designed (FIG. 6B).

Figure 6C:
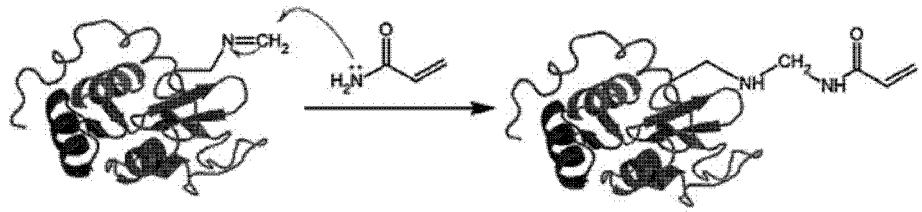
Figure 6D:
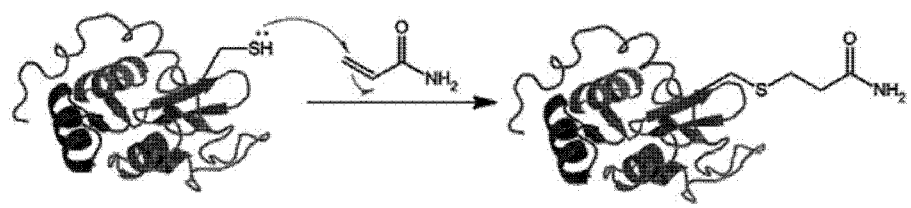
Figure 6E:
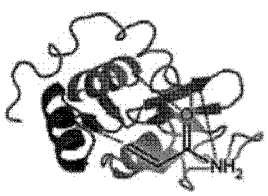

Further formaldehyde modification of formaldehyde-fixed lysozyme occurred quickly within an hour; whilst the effect of acrylamide takes 24 hours. This was manifested as a global right-shit of the m/z peaks heterogeneously and the generation of significant noise in the peak patterns, making it difficult to identify the precise modifications that actually occurred. It appears that acrylamide does play a role in modifying lysozyme under CLARITY™ conditions, but whether this occurred in the desired manner as in FIG. 6A is unknown (FIGS. 6C-6E).

Discussion

The results suggest that given sufficient fixation, a hydrogel would be unnecessary to protect tissues during aggressive delipidation. Although cells burst when their plasma membranes are disrupted, cellular integrity differs from tissue integrity. While the former might be largely maintained by plasma membranes, tissues are mechanically robust and their integrity is maintained by an array of intracellular cytoskeletons, cooperative transmembrane adhesion junctions, and extracellular connective components. Moreover, the fixation process of the cytoplasm as a gel with extremely high protein densities provides further stabilization by crosslinking proteins in three dimensions, forming a natural barrier against protein leakage as well as antibody penetration. In support of the hypothesis that proteins, but not lipids, are the key to tissue integrity, the non-specific protease proteinase K can digest and dissolute 1% acrylamide-embedded, SDS-delipidated brain slices completely into a homogeneous solution in 3 hours at 37° C., while with the more specific protease Clostridium histolyticum collagenase, a friable brain slice with discernible anatomy remained even with overnight digestion.

SDS denatures proteins and thus their adhesive interactions, which might account for the necessity of tissue protection either by fixation or hydrogel embedding. Although the protein mass spectrometry data suggest that acrylamide does interact with proteins in some way, the exact reaction products remain obscure, as the heterogeneous peak changes can reflect either (1) nucleophilic addition of acrylamide to formaldimines (FIGS. 6C-6E), (2) nucleophilic addition of cysteines, lysine or histidine to the Michael-receptive double bond of acrylamide (which would render it unavailable to crosslink to the hydrogel meshwork (FIG. 6D), or (3) formation of simple adducts (FIG. 6E). Further, protein crosslinking rigorously occurs during tissue fixation, consuming the reactive formaldimines essential for the addition of acrylamide (path b in FIG. 6A) in the desired manner. Such protein cross-linkage is absent in an in vitro model reaction and/or undetectable with current protein mass spectrometry technologies due to the large mass of the crosslinked proteins. The relative significance of these 'side reactions' is uncertain, therefore whether acrylamide can react with formaldehyde-modified proteins in situ is uncertain. Although the disclosed hydrogel monomer solution contains 4% paraformaldehyde (PFA) that might generate more formaldimines for acrylamide to react with, omission of the 4% PFA suggested by an alternative version of CLARITY™ gave almost equal results in terms of tissue protein retention and immunolabeling quality. This indicates that either a conventional fixation would have consumed and saturated most formaldimines and other residues reactive to formaldehyde, or the proposed acrylamide cross-linkage reaction does not occur to a significant extent in situ. In keeping with this, studies on the amount of protein lost into the clearing buffer found only a mild increase in protein lost from non-embedded samples compared with those embedded in acrylamide, most likely attributable to the diffusion constraints of the hydrogel against protein leakage rather than proteins stably crosslinked to a physical meshwork. Interestingly, the SEMs and deductions above suggest that we could expect minimal increase in immunolabeling speed even when the hydrogel is omitted, as this merely eliminates the flow restriction of antibodies created by the porous hydrogel, not the diffusion limitations caused by the inherent high density of tissues.

As a rule of thumb, if the diffusion of formaldehyde fixative is not limited, fixing tissues for 3 days at room temperature is sufficient for a mouse's whole brain for subsequent tissue clearing in 8% SDS, while a whole human post-mortem brain fixed for 3 weeks at room temperature has tolerated up to about 3 months of 8% SDS treatment at 55° C. Further, since the subsequent immersion of tissues in the RI homogenizing solutions aids in making tissues transparent, aggressive delipidation to completion is usually not required. For example, a 2 mm-thick mouse brain slice fixed for 3 days to 1 year can be immersed in 8% SDS for 3 to 7 days at 37° C., after which good transparency can be achieved by immersing the partially delipidated tissue into the iohexol-based RI homogenizing solution. Such partial delipidation approach saves time and avoids the risk of excessive tissue damage, yet the permeabilisation remains adequate for the penetration of antibodies and chemical dyes.

It is understood that the disclosed method and compositions are not limited to the particular methodology, protocols, and reagents described as these may vary. It is also to be understood that the terminology used herein is for the purpose of describing particular embodiments only, and is not intended to limit the scope of the present invention which will be limited only by the appended claims.

The invention claimed is:

1. A tissue clearing composition, comprising a homogenizing agent, a water-soluble adjusting agent, and a lipid-soluble adjusting agent, wherein
   (a) the homogenizing agent is selected from the group consisting of N-methylglucamine and ethylenediamine;
   (b) the water-soluble adjusting agent is selected from the group consisting of iohexol, sodium thiosulfate, and polyethylene glycol; and
   (c) the lipid-soluble adjusting agent is selected from the group consisting of 2,2'-thiodiethanol and propylene glycol.

2. The tissue clearing composition of claim 1, wherein
   (a) the homogenizing agent is N-methylglucamine;
   (b) the water-soluble adjusting agent is selected from the group consisting of iohexol, sodium thiosulfate, and polyethylene glycol; and
   (c) the lipid-soluble adjusting agent is selected from the group consisting of 2,2'-thiodiethanol and propylene glycol.

3. The tissue clearing composition of claim 2, wherein the homogenizing agent is N-methylglucamine, the water-soluble adjusting agent is iohexol, and the lipid-soluble adjusting agent is 2,2'-thiodiethanol.

4. The tissue clearing composition of claim 3, wherein the concentration of each of N-methylglucamine, iohexol, and 2,2'-thiodiethanol ranges from 10% to 50%.

5. The tissue clearing composition of claim 4, wherein the concentration of N-methylglucamine is 20%, the concentration of iohexol is 32%, and the concentration of thiodiethanol is 25%.

6. The tissue clearing composition of claim 2, wherein the homogenizing agent is N-methylglucamine, the water-soluble adjusting agent is iohexol, and the lipid-soluble adjusting agent is propylene glycol.

7. The tissue clearing composition of claim 6, wherein the concentration of each of N-methylglucamine and iohexol ranges from 10% to 50% and the concentration of propylene glycol ranges from 10% to 60%.

8. The tissue clearing composition of claim 7, wherein the concentration of N-methylglucamine is 20%, the concentration of iohexol is 32%, and the concentration of propylene glycol is 35%.

9. The tissue clearing composition of claim 1, wherein the water-soluble and lipid-soluble adjusting agents are refractive index adjusting agents.

10. A method of clearing tissues comprising incubating a sample tissue in the tissue clearing composition of claim 1.

11. The method of claim 10, wherein the tissue is incubated for a period of time ranging from 3 hours to 24 hours at a temperature ranging from 37° C. to 55° C.

12. The method of claim 10, wherein the sample tissue is human tissue.

13. The method of claim 10, wherein the sample tissue is brain tissue.

14. The method of claim 10, wherein the sample tissue is archived tissue.

15. The method of claim 14, wherein the sample tissue has been archived for up to 50 years.

16. The method of claim 10 further comprising, prior to incubating the sample tissue, selecting a homogenizing agent, a water-soluble adjusting agent, and a lipid-soluble adjusting agent and mixing the homogenizing agent, water-soluble adjusting agent, and lipid-soluble adjusting agent to form the tissue clearing composition.

17. A method of making the tissue clearing composition of claim 1, wherein the method comprises mixing the homogenizing agent, the water-soluble adjusting agent, and the lipid-soluble adjusting agent to form the tissue clearing composition.

18. A tissue clearing composition consisting of a homogenizing agent, a water-soluble adjusting agent, a lipid-soluble adjusting agent, and one or more diluents, wherein
   (a) the homogenizing agent is urea;
   (b) the water-soluble adjusting agent is selected from the group consisting of iohexol, sodium thiosulfate, and polyethylene glycol; and
   (c) the lipid-soluble adjusting agent is selected from the group consisting of 2,2'-thiodiethanol and propylene glycol.

19. The tissue clearing composition of claim 18, wherein the homogenizing agent is urea, the water-soluble adjusting agent is iohexol, and the lipid-soluble adjusting agent is 2,2'-thiodiethanol.

20. The tissue clearing composition of claim 18, wherein the concentration of urea ranges from 5-50%, and the concentration of each of iohexol and 2,2'-thiodiethanol ranges from 10% to 50%.

21. The tissue clearing composition of claim 18, wherein the concentration of urea is 10%, the concentration of iohexol is 32%, and the concentration of 2,2'-thiodiethanol is 25%.

22. The tissue clearing composition of claim 18, wherein the one or more diluents are selected from the group consisting of concentrated hydrochloric acid, water, phosphate-buffered saline (pH 6.8-7.6), tris hydrochloride buffer (pH 6.8-7.6), 0.01% sodium azide, and combinations thereof.

* * * * *